United States Patent Office 3,545,225
Patented Dec. 8, 1970

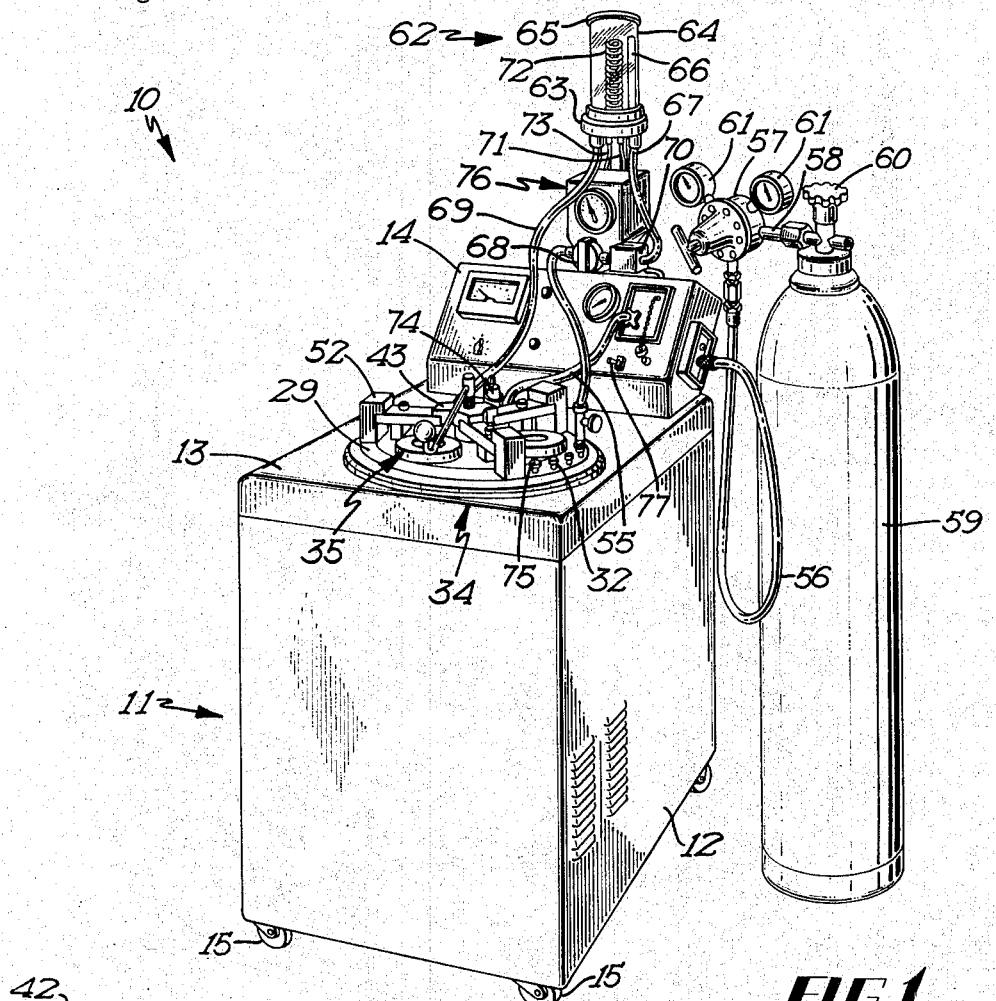
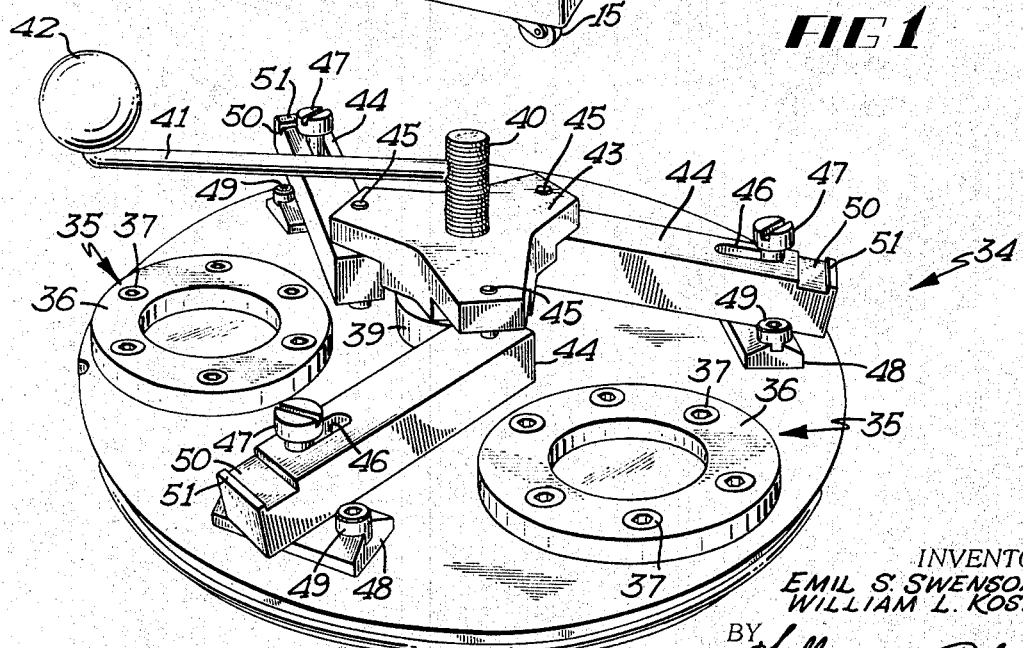

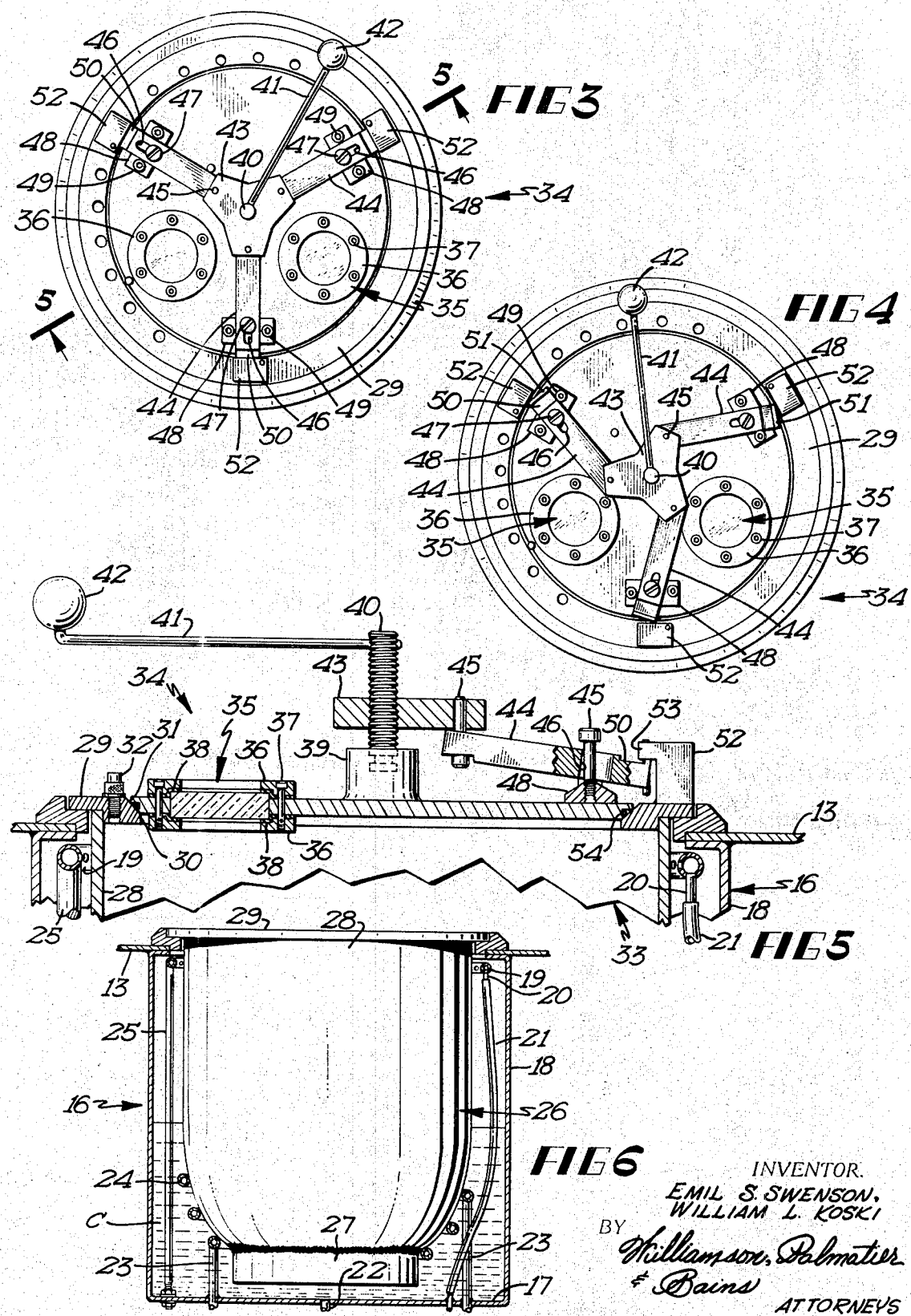

3,545,225
APPARATUS FOR MAINTAINING WHOLE
ORGANS IN A VIABLE STATE
Emil S. Swenson, Coon Rapids, and William L. Koski,
Minnneapolis, Minn., assignors to Swenko Research &
Development, Incorporated of Minneapolis, Minnesota,
Minneapolis, Minn., a corporation of Minnesota
Filed Aug. 16, 1968, Ser. No. 753,220
Int. Cl. A61b 19/00
U.S. Cl. 62—265                          7 Claims

ABSTRACT OF THE DISCLOSURE

Apparatus for preserving and maintaining whole organs in a viable state in preparation of transplanting, such organs including a cabinet having a hypothermia tank for cooling a preservation vessel, the latter having an open top, closed by a closure which is releasably locked in place by quick-acting ready releasable means to permit the closure to be quickly removed and applied as desired. The preservation receptacle having a plurality of fittings therein, one of which is connected to a source of oxygen under pressure and another fitting being connected to a pressure release valve mechanism to permit controlled depressurization of the interior of the preservation receptacle. A perfusing container is connected in communicating relation with the receptacle and having cooling means to permit the contents thereof to be cooled to a predetermined temperature.

SUMMARY OF THE INVENTION

An object of this invention is to provide an apparatus for maintaining whole organs in a viable state in preparation of transplanting such organs, which includes a preservation receptacle cooled by a suitable hypothermia system, with a provision for cooling means for cooling a perfusion container which is connected in communicating relation to the preservation receptacle.

Another object of this invention is a provision of an apparatus for use in maintaining whole organs in a viable state wherein the preservation receptacle is connected to a source of oxygen under pressure and is also provided with decompression valve mechanism operable to cause predetermined decompression of the interior of the receptacle.

BRIEF DESCRIPTION OF THE FIGURES OF THE DRAWING

FIG. 1 is a perspective view of the apparatus comprising the present invention,

FIG. 2 is an enlarged perspective view of the closure of the preservation receptacle illustrating the details of construction thereof, FIG. 3 is a top plan view of the closure of the preservation receptacle in the locked condition, FIG. 4 is a top plan view of the closure for the preservation receptacle in the unlocked condition, FIG. 5 is a cross-sectional view taken approximately along line 5—5 of FIG. 3 and looking in the direction of the arrows, FIG. 6 is a vertical cross-sectional view of the preservation receptacle and hypothermia tank illustrating details of construction thereof.

DETAILED DESCRIPTION OF THE INVENTION

Referring now to the drawings and more specifically to FIG. 1, it will be seen one embodiment of the whole organ preservation device, designated generally by the reference numeral 10, is there shown. This apparatus 10 includes a generally rectangular shaped cabinet 11 having upstanding side walls 12 and a top wall 13. A control panel housing 14 is secured to the rear portion of the top wall 13 and projects upwardly therefrom. The cabinet 11 is provided with castors 15 to permit ready movement of the apparatus from one location to another.

The top wall 13 of the cabinet has an opening therein and an open top hypothermia tank 16 has its upper peripheral edge portion secured to the top wall so that its open top thereof is in registering relation with the opening in the top wall. The hypothermia tank 16 includes the bottom wall 17 having an upstanding continuous peripheral wall 18 integrally formed therewith. An annular conduit or spray ring 19 is positioned interiorly of the hypothermia tank adjacent the upper end thereof and this spray ring has a plurality of apertures therein throughout its circumference to permit a liquid coolant to be evenly distributed downwardly from the spray ring. The spray ring 19 is supported by suitable support posts 25 which extend vertically through and are rigidly affixed ot the bottom wall 17 of the hypothermia tank. The spray ring 19 has an inlet which is connected by coupling member 20 to one end of an elongate supply conduit 21 which extends through an opening in the bottom wall 17 of the hypothermia tank in sealing relation therewith. The hypothermia tank is also provided with an opening in the bottom wall 17 thereof and a return conduit 22 is connected in communicating relation with this opening in the bottom wall of the tank. It is pointed out that a liquid coolant is supplied to the hypothermia tank through the conduit 21 and is removed therefrom through the conduit 22.

It will be noted that the hypothermia tank contains a predetermined amount of liquid coolant C which may be a suitable weak alcohol solution or a permanent antifreeze solution as desired. The liquid coolant is maintained at a predetermined temperature and in the embodiment shown is preferably maintained at a temperature of approximately zero (0°) degrees centigrade to four (4°) degrees centigrade. A pump (not shown) is also provided for circulating the liquid coolant between the hypothermia tank and a reservoir (not shown).

Means are provided for cooling the liquid coolant and in the embodiment shown, a pair of conduits 23 extend through the bottom wall of the hypothermia tank and are shaped into coils 24 which are immersed in the liquid coolant C within the hypothermia tank. These coils 24 are connected to a suitable refrigeration system such as that shown in my copending application Ser. No. 391,931, filed Aug. 25, 1964.

A preservation receptacle 26 formed of a suitable rigid material, preferable stainless steel, is positioned within the hypothermia tank so that a substantial portion of the receptacle is immersed in the liquid coolant. The preservation receptacle includes a bottom wall 27 having a closed continuous peripheral wall 28 integrally formed therewith and projecting upwardly therefrom. An annular lip 29 is integrally formed with the peripheral wall of the receptacle and projects only slightly radially inwardly therefrom so that substantially the entire upper end of the receptacle defines an access opening 30. It will be noted that the inner peripheral edge of the lip 29 is tapered downwardly and inwardly as at 31 and that the lip has a plurality of vertical openings therein each accommodating a fitting 32 therethrough. These fittings communicate with the interior of the receptacle and the purpose of these fittings will be discussed more fully hereinbelow.

The interior 33 of the preservation receptacle defines a preservation chamber which is adapted to contain the whole organ to be transplanted. A suitable closure 34 is provided for sealingly closing the preservation chamber 33 from the exterior and this closure is also provided with suitable observation windows 35 to permit an observer to observe the interior of the receptacle. It will be noted that these observation windows 35 are clamped into openings in the closure 34 by upper and lower annular frames 36 which are clamped together by nut and bolt assemblies 37. Suitable gaskets 38 are interposed between each annular frame 36 and the adjacent surface of the closure 34 to form a seal thereof.

The closure 34 is also provided with a centrally located boss 39 which is provided with an upwardly opening recess therein for revolvably receiving the lower end of an upstanding bolt or screw 40. The screw 40 is provided at its upper end with an elongate handle 41 which has a knob 42 at its outermost end to facilitate revolving the screw 40. It will be seen that the screw 40 may be readily revolved relative to the boss 39 even though the screw 40 is anchored in the boss.

An actuating nut 43 threadedly engages the screw 40 and is axially vertically movable relative thereto in response to rotation of the screw.

A plurality of elongate similar locking members 44 are each pivotally connected by means of a pivot pin 45 to the actuating nut 43 adjacent the lower surface thereof. In the embodiment shown, three such locking members 44 are provided, and it will be noted that the actuating nut 43 has three equally spaced apart projections for connection to the locking members. Each locking member has an elongate longitudinally extending vertical slot 46 therethrough adjacent the outer end thereof and this slot loosely accommodates a bolt 47 therethrough, the bolt being secured to a fulcrum block 48 whose upper surface is concave and slopes downwardly from a peak. Each fulcrum block is secured to the closure 34 adjacent the marginal portions thereof by means of bolts 49 which also serve to limit horizontal swinging movement of the associated locking member about its vertical axis.

An outer end portion of each locking member has a relatively wide upwardly facing transverse groove 50 in the upper surface thereof to define a lip 51. The annular lip 29 of the preservation receptacle 26 also has a plurality of locking blocks or members 52 secured thereto and projecting upwardly therefrom. Each block 52 has an inwardly projecting lip 53 which is adapted to be engaged by the lip 51 of the associated locking member to retain the same in locked condition.

It will be seen that by revolving the screw 40, the locking members 44 may be urged into and out of locking relation with the associated locking blocks 52. In this regard, it will be seen that when the screw 40 is revolved in one direction, the actuating nut 43 will be shifted axially downwardly relative to the screw thus causing the outer end portion of the locking members to be urged upwardly into engaging relation with the lip of the associated locking block. This, of course, effectively locks the closure 34 in the sealed relation with respect to the preservation receptacle 26. An O-ring type sealing member 54 is positioned in an annular groove formed in the bevelled or tapered surface of the closure and sealingly engages the tapered edge 31 of the annular lip 29. It will be appreciated that the interior of the preservation receptacle is subjected to substantial pressure and the locking means not only permits safe effective locking of the closure but also permits ready release thereof.

To this end, when it is desirable to unlock the locking members 44 from locked relation with respect to the locking blocks 52, it is merely necessary to revolve the screw 40 in a direction to cause the nut 43 to be moved axially upwardly. When this occurs, the outer end portion of the locking members will be urged downwardly and thereby permit each locking member to be swung laterally about its vertical axis defined by the bolt 47, and to be disengaged from the locking block.

It will be seen that one of the fittings 32 is threadedly connected in communicating relation to one end of a conduit 55 which has its other end connected in communicating relation to one of a plurality of fittings to which are secured to the instrument panel housing 14. A manifold line (not shown) is connected to a pneumatic supply conduit 56 which has its other end connected to a valve 57 which in turn is connected to an outlet pipe 58 of an oxygen tank 59. The oxygen tank 59 is provided with a conventional suitable control valve 60, while the valve 57 is provided with a pair of conventional pressure gauges 61. It will therefore be seen that oxygen under pressure may be supplied to the preservation chamber 33. The oxygen pressure in the preservation receptacle is approximately three atmospheres of oxygen which constitutes approximately 60 to 100 p.s.i. However, it has been found that in practice the oxygen pressure need not ordinarily exceed 75 p.s.i. on order to provide the desirable hypebaric conditions for organ preservation.

The apparatus 10 also includes a perfusion container 62 which is supported preferably above the control panel housing 14 in the manner of support of the perfusion chamber in my copending application, Ser. No. 640,265 filed May 15, 1967. The perfusion chamber has a bottom wall 63 preferably formed of a suitable metallic material and has an upstanding transparent continuous peripheral wall 64 secured thereto. This peripheral wall 64 may be formed of a suitable plastic material and is secured to an upper wall 65 also formed of a suitable metal. A stand pipe 66 is connected to a fitting in the bottom wall of the perfusion container and projects interiorly of the container.

The perfusion container has a perfusion conduit 67 connected to a suitable fitting on the bottom wall 63 and communicates interiorly with the perfusion container. A timer or percentage type valve control mechanism 68 is interposed in flow controlling relation with respect to the perfusion conduit 67 and this valve control mechanism 68 serves to operate in the manner of the valve mechanism disclosed in my copending application, Ser. No. 640,265. In this regard, it was pointed out that the valve control mechanism 68 includes a solenoid valve which is operable to open the perfusion conduit 67 when energized and when de-energized closes the perfusion conduit. A percentage timer, which is capable of being preset also constitutes a part of the percentage of valve control mechanism and is interposed in circuit controlling relation with respect to the solenoid valve of the valve mechanism 68. The timer control will have an indicator valve and as pointed out above will be constructed for operation in the manner set forth in my copending application.

The conduit 55 is connected to one of the fittings 32 on the annular lip 29 and a small flexible conduit extends through the fitting so that a cannula or other perfusion instrument on the end of the conduit may be inserted into the organ to be perfused. Again it is pointed out that the entire perfusion system is arranged and constructed substantially identical to that in my copending application, Ser. No. 640,265, except that a pump is provided for positively directing the perfusate to the organ.

Thus a conduit 69 is connected to a fitting on the bottom wall of the perfusion container, the fitting also being connected to the stand pipe 66. The conduit 69 is also connected to a fitting 32 on the annular lip of the preservation receptacle. With this arrangement, the pressure within the perfusion container is in a state of equilibrium with respect to the pressure in the preservation receptacle, thus permitting even flow of the perfusate from the perfusion container.

In order to assure a more desired control of the perfusate into the organ being preserved, a suitable pump mechanism 70 is interposed in flow controlling relation with respect to the perfusion conduit. The pump is operable in response to the timer of the valve control mechanism so that controlled perfusion is obtained in accordance with a preset timing operation.

It will also be noted that the perfusion container has a conduit 71 extending through the bottom wall 63 thereof in sealing relation therewith to form a coil 72 interiorly of the container, the other end of the coil being connected by a conduit 73. These conduits are connected in communicating relation to the hypothermia tank so that the liquid coolant may be circulated through the coil to cool the contents of the perfusion container to approximately the same temperature as the organ being perfused. A small pump (not shown) is provided for circulating the liquid coolant between the hypothermia tank and the perfusion container. It has been found that it is also important to maintain the contents of the perfusion container in a cooled condition in the event that ambient temperatures over a period of time would be detrimental to the perfusate. This is true when the perfusate comprises whole blood, plasma or the like.

Another of the fittings 32 wil be provided with a pressure responsive safety valve mechanism 74 which when open intercommunicates the interior of the preservation chamber with the exterior. The safety valve is normally closed and in the embodiment shown is preset to open in response to a pressure which exceeds one-hundred pounds.

Another of the fittings 32 has a decompression valve device connected thereto to permit the preservation chamber 33 to be progressively decompressed in a controlled manner.

In this regard, it is pointed out that the chamber must be decompressed prior to removal of the organ from the chamber for transplant. The decompression valve device 75 also includes a percentage valve control mechanism 76 which may be preset to allow controlled depressurization of the preservation chamber. The time type percentage control valve mechanism will be preset to permit alternate opening and closing of the valve. With this arrangement, the oxygen may be reduced to atmospheric pressure in a controlled manner without necessitating an operator in attendance. For example, the valve element of the valve mechanism may be opened for a period of two seconds, and then closed for a period of thirty seconds.

The instrument panel of the instrument housing includes a master switch 77 which is shiftable between open and closed positions to selectively energize the circuit to the percentage control valve mechanism associated with the perfusion system as well as energizing the circuits to the refrigeration system and the hypothermia and perfusion pumps. The other gauges on the instrument panel indicates the oxygen pressure within the preservation chamber as well as the temperature thereof.

The operation of the apparatus is similar to that of my copending application, Ser. No. 640,265, with the exception that a perfusate is maintained in a cool condition approximating the temperature of the preservation chamber 33. Further, the present apparatus is provided with automatic means to permit control depressurization of the preservation chamber prior to removal of the organ from the chamber.

It will therefore be seen from the foregoing description that we have provided a novel whole organ preservation system wherein organs to be transplanted are placed in hypothermic, hypebaric environment while being perfused with suitable perfusate. The perfusate used may consist of a balanced salt medium, which is sold under the trade name "Tis-U-Sol" and which contains 5% dextran with a low molecular weight of 40 and 50 milligrams of sodium heparin for 500 milliliters of solution. The perfusate is preferable buffered to a pH of 7.4 with tromethamine and sodium bicarbonate.

The present apparatus thus not only permits maintenance of the organ in a hypothermic hypebaric environment with continuous controlled perfusion, but it is also provided with means to permit controlled depressurization of the preservation chamber. The uniquely constructed closure member permits effective sealing of the preservation receptacle but also permits ready opening of the receptacle.

Thus it will be seen that we have provided a novel preservation apparatus system which is highly effective for maintaining organs in a viable condition in preparation to transplantation of the organs.

It will, of course, be understood that various changes may be made in the form, details arrangement and proportions of the various parts without departing from the scope of my invention.

What we claim is:

1. Apparatus for preserving and maintaining organs in a completely viable state for transplantation, comprising the hypothermia tank containing a predetermined amount of liquid coolant, refrigeration means for cooling the liquid coolant in said hypothermia tank, a preservation receptacle positioned within said tank and being partially immersed in the liquid coolant therein, said receptacle having an opened top defining an access opening to permit access to the interior thereof, a removable closure for closing said access opening in sealing relation, a plurality of locking members on said receptacle, a plurality of locking arms on said closure being shiftable between locked and released positions, each arm engaging one of the locking members when in the locked position to lock the closure in closing relation, and being disengagable from the locking members when in the released condition, means for simultaneously shifting said locking arms between the closed and opened positions, a source of oxygen under pressure, a conduit interconnecting said source of oxygen under pressure with the interior of said preservation receptacle for supplying oxygen under pressure thereto, said receptacle having an outlet, a valve mechanism for opening and closing said outlet, means for controlling said valve mechanism to permit the valve mechanism to be continuously opened and closed in a predetermined manner to thereby permit controlled decompression of the preservation receptacle.

2. The apparatus as defined in claim 1 and a perfusion container adapted to contain a perfusion solution therein, an elongate conduit having one end thereof communicating with the upper portion of said perfusion container and having another end thereof connected in communicating relation with the interior of the preservation receptacle whereby the oxygen pressure within the receptacle and container are maintained in the state of equilibrium, an elongate conduit having opposite ends thereof connected in communicating relation to the hypothermia tank, said last-mentioned conduit being bent into a plurality of coil positioned within the perfusion container to thereby permit cooling of the perfusion solution, a perfusion conduit having one end thereof connected in communicating relation to the lower end of the perfusion container and being connected in communicating relation with the interior of the preservation receptacle, means connected to the other end of said perfusion conduit and insertable into a vessel of the organ being preserved whereby a liquid perfusate may be perfused into the organ.

3. The apparatus as defined in claim 1 wherein said refrigeration means includes a plurality of cooling coils positioned within said hypothermia tank.

4. The apparatus as defined in claim 1 wherein said means for shifting said locking arms comprises an elongate screw revolvably mounted on said closure, an actuating nut threadedly engaging said screw and being axially movable or relative thereto, said nut being pivotally connected to said arms and shifting said arms between locked and released positions during shifting movement of the nut.

5. The apparatus as defined in claim 4 and a plurality of fulcrum members on said closure, each of said arms being positioned upon one of said fulcrum members and being lockable relative thereto about a substantially horizontal axis when shifted between locked and released positions.

6. The apparatus as defined in claim 1 wherein said closure has a plurality of observation windows therein to permit visual perception of the interior of the receptacle while in the sealed condition.

7. The apparatus as defined in claim 1 and a pump interposed in flow controlling relation with said perfusion conduit and being operable to pump the liquid perfusate from said perfusate container into the organ being perfused.

References Cited

UNITED STATES PATENTS 3,468,136  9/1969  Swenson et al. _____ 62—64

FOREIGN PATENTS 23,427  10/1956  Germany _____ 128—1

LAWRENCE W. TRAPP, Primary Examiner

U.S. Cl. X.R.

62—78